United States Patent [19]

McCrickerd

[11] Patent Number: 4,645,291

[45] Date of Patent: Feb. 24, 1987

[54] HOLOGRAPHY WITH INSENSITIVITY TO OBJECT SIZE

[75] Inventor: John T. McCrickerd, Costa Mesa, Calif.

[73] Assignee: Newport Corporation, Fountain Valley, Calif.

[21] Appl. No.: 596,665

[22] Filed: Apr. 4, 1984

[51] Int. Cl.[4] .............................................. G03H 1/04
[52] U.S. Cl. .................................................... 350/3.83
[58] Field of Search ............................ 350/3.83, 3.84; 356/347, 348; 73/656

[56] References Cited

U.S. PATENT DOCUMENTS 3,528,719  9/1970  Brooks ............................... 350/3.83

FOREIGN PATENT DOCUMENTS 0765649  7/1978  U.S.S.R. ............................. 356/347

Primary Examiner—Bruce Y. Arnold
Attorney, Agent, or Firm—Benoit Law Corporation

[57] ABSTRACT

Holograms of objects are made on a light-responsive medium with the aid of a reference beam and an object beam reflected by the object and, throughout the light-responsive medium, are rendered insensitive to object size by projecting the reflected object beam onto the medium at an angle to said reference beam which is constant throughout the medium within a tolerance imperceptible to that light-responsive medium in terms of spatial frequency of the hologram. Preferably, the reflected object beam is projected onto the light-responsive medium at a constant angle of incidence throughout that medium, and is projected through an aperture having a diameter equal to the angle of the reflected object beam to the reference beam, divided by the product of an angular resolution of the hologram and the above mentioned spatial frequency.

20 Claims, 1 Drawing Figure

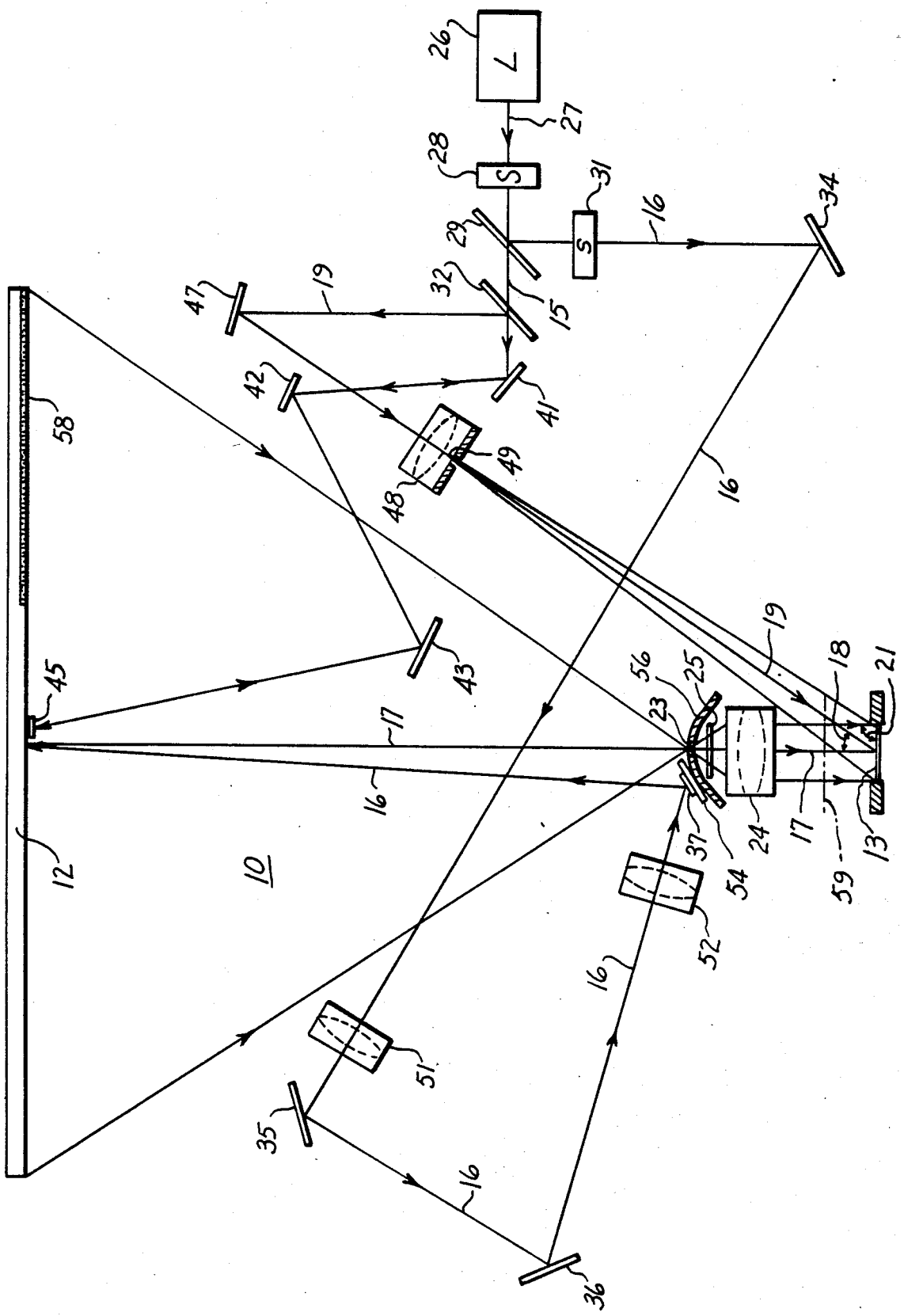

HOLOGRAPHY WITH INSENSITIVITY TO OBJECT SIZE

BACKGROUND OF THE INVENTION

1. Field of the Invention

The subject invention relates to methods and apparatus for producing interference fringe patterns for holograms, to hologram interferometry, and to real-time visualization of vibration patterns.

2. Information Disclosure Statement

The disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also the following comments contain conclusions and observations which have only been drawn or become apparent after conception of the subject invention or which contrast the subject invention or its merits against the background of developments subsequent in time or priority.

In holography, the spatial frequency or fringe spacing is proportional or inversely proportional, respectively, to the angle between the object and reference beams at the hologram. Especially if holograms of large objects are taken, the angle between object beam and reference beam varies across the hologram, whereby the hologram is in effect sensitive to object size.

Reference may in this respect be had to articles entitled *The Non-Stroboscopic Visualisation of Vibration Patterns by Real Time—Time Averaged Hologram Interferometry*, by P. Waddell and W. McCracken, Proc. ElectroOptical Systems Design Conf., Brighton (1972), pp. 14 to 22, *The Study of Vibration Patterns Using Real-Time Hologram Interferometry*, by W. F. Fagan, P. Waddell and W. McCracken, Optics and Laser Technology (August 1972), pp. 167 to 172, and *A Hologram Interferometer with a Retro-Reflected Speckle Reference Beam for the Real Time Visualization of Vibration Patterns*, by W. F. Fagen and P. Waddell, Proc. Brit. Acoustical Society, Vol. 2, No. 3 (Winter 1973).

In these and other holographic systems, the light-responsive medium on which holograms are made has a certain bandwidth of optimum spatial frequency response.

This is distinctly the case with thermoplastic hologram recording media where the finite thickness of the thermoplastic film limits the flow of thermoplastic material available for recording purposes. Reference may in this respect be had to the article entitled *Thermoplastic Xerographic Holography*, by J. C. Urbach and R. W. Meier, APPLIED OPTICS, Vol. 5, No. 4 (April 1966), pp. 666/67, and to U.S. Pat. Nos. 3,560,205 and 3,655,257, by J. C. Urbach, disclosing methods and apparatus for forming a phase hologram on a deformable thermoplastic. Similar frequency limitations or sensitivities are observed with holographic recording media of a silver-halide or other photographic type, and also in holographic systems employing video cameras or other video systems for observation and similar purposes.

Accordingly, holographic systems of the subject type suffer degradation, if recorded or observed spatial frequencies go beyond the optimum bandwidth of the recording or observation medium.

The presence of wavelengths or spatial frequencies outside the optimum range of the holographic recording or light-responsive medium, as well as a superposition of a broad range of spatial frequencies at any spot on the medium, as would be caused by an angular extent of the object beam with respect to that spot, leads to objectionable signal-to-noise ratios. This is particularly the case when a large object size leads to angular incidence variations across the recording or light-responsive medium. In laboratory terminology, the hologram then has to "work harder" in order to provide the desired image or pattern. This means, in so many words, that a relatively high amount of energy is required to reproduce the holographic image, since a high proportion of the energy is being expended to reconstruct a multitude of rays, and this extensive activity generates a proportionate level of optical noise.

SUMMARY OF THE INVENTION

It is a general object of this invention to overcome the disadvantages and to meet the needs expressed or implicit in the Information Disclosure Statement and in other parts hereof.

It is a related object of this invention to provide improved holographic systems and holograms.

It is a germane object of this invention to render holograms insensitive to object size across or throughout light-responsive media on which they are taken.

It is a related object of this invention to adapt holograms in spatial frequency to bandwidths of recording or light-responsive media on which they are made.

It is also an object of this invention to improve the signal to noise ratio in holograms and holographic systems.

It is a germane object of this invention to reduce energy requirements for reproducing holograms.

Other objects of this invention will become apparent in the further course of this disclosure.

From a first aspect thereof, the subject invention resides in a method of making a hologram of an object on a light-responsive medium with the aid of a reference beam and an object beam reflected by the object. The invention according to this aspect resides, more specifically, in the improvement comprising the step of rendering the hologram throughout the light-responsive medium insensitive to object size by projecting the reflected object beam onto the medium at an angle to the reference beam constant throughout the medium within a tolerance imperceptible to the light-responsive medium in terms of spatial frequency of the hologram.

From a related aspect thereof, the subject invention resides in apparatus for making a hologram of an object on a light-responsive medium with the aid of a reference beam and an object beam and, more specifically, resides in the improvement comprising, in combination, first means for projecting the object beam to the object for reflection thereby, and second means for rendering the hologram throughout the light-responsive medium insensitive to object size, including means for projecting the reflected object beam onto the medium at an angle to the reference beam constant throughout the medium within a tolerance imperceptible to the light-responsive medium in terms of spatial frequency of the hologram.

BRIEF DESCRIPTION OF THE DRAWINGS

The subject invention and its various objects and aspects will become more readily apparent from the following detailed description of preferred embodiments thereof, illustrated by way of example in the accompanying plane view of a holographic system according to a preferred embodiment of the subject invention.

DESCRIPTION OF PREFERRED EMBODIMENTS

The holographic system 10 shown in the drawing serves to take or make holograms of various objects, such as the object shown at 12. By way of example and not by way of limitation, holography provides a quick way of watching an entire part or object vibrate, identify its various resonant frequencies, and determine exact vibration amplitudes at any point on the object. Again by way of example, holography has been applied to the design and vibration analysis of turbine blades, rocket casings, pressure vessels, loudspeakers, transducers, engines and all kind of other parts and structures.

Other applications include the detection of submicron deformations as an assistance to the design or alignment of critical parts. Stress-strain measurements are also conveniently carried out by holography, as are detection and observation of thermal strains, pressure effects and internal defects, to name just a few more examples.

The illustrated system 10 is capable of making a hologram of object 12 on a light-responsive medium 13. By way of example, photographic, thermoplastic or electrooptical media may be employed at 13. For instance, 13 may be the electrooptical target of a video camera, if the holographic data is to be recorded by electronic-scan methodology.

On the other hand, the hologram may be recorded at 13, such as with the aid of a silver-halide film or on a thermoplastic stratum.

It is well known in this respect that thermoplastic recording of holograms may be effected by depositing a uniform charge on a thermoplastic layer on a photoconductor. Exposure of such thermoplastic/ photoconductor combination to a laser fringe pattern redistributes the charges through the photoconductor, which may thereupon be recharged to increase the electric field across the exposed area of the thermoplastic. Heating of the thermoplastic causes permanent deformation and the resulting irregularities will defract light to recreate the original or recorded image. The hologram may be erased by controlled heating, and a darkroom is not generally required when making holograms with thermoplastic recording media.

For more information, reference may be had to the assignee's brochure entitled *Introducing the Newport Instant, Automatic Holographic Camera,* to the article by T. C. Lee and R. Erickson, entitled *A Holocamera for Non-Destructive Testing,* to the above mentioned Urbach article and patents, and to U.S. Pat. Nos. 3,055,006, by A. W. Dreyfoos, et al, disclosing thermoplastic image recording, 3,213,429, by F. A. Schwertz, disclosing a thermoplastic information recorder, and 3,547,628, by N. E. Wolff, disclosing thermoplastic deformation imaging; all incorporated by reference herein.

The hologram is made on the light-responsive medium with the aid of a reference beam 15 and an object beam 16 which is reflected by the object as shown at 17.

As more fully disclosed below, the subject invention renders the hologram throughout the light-responsive medium insensitive to object size by projecting the reflected object beam 17 onto the medium 13 at an angle 18 to the returning reference beam 18 constant throughout the medium within a tolerance imperceptible to that light-responsive medium 13 in terms of spatial frequency of the hologram.

As mentioned above, light-responsive media of the type of medium 13 have a certain bandwidth of optimum spatial frequency response. The angle 18 between object and reference beams 17 and 19, on the other hand, determines the spatial frequency of the hologram, as such frequency is equal to the quotient of such angle 18 and wavelength. Accordingly, if the angle 18 at all points across the medium 13 remains sufficiently constant so that the resulting spatial frequency of the hologram remains within the bandwidth of the medium, the quality of the hologram is uniform throughout the medium.

In this respect, the expression "throughout the medium" refers to the light-responsive medium in at least two dimensions, namely horizontally across, as well as vertically across. Of course, if the structure of the medium is larger than a light-responsive region used for holographic purposes, then the expression "throughout the medium" covers only that actually used region.

In practice, the above mentioned feature of the subject invention concerning the constancy of the object and reference beam angle throughout the medium 13 within the defined imperceptible tolerance effectively renders the hologram insensitive to the size of the object 12. This stands in favorable contrast to the prior-art systems in which the hologram of larger objects degraded towards the periphery of the object.

In viewing the drawing, it should be understood that this illustration is not to scale, but has been compressed vertically in order to enable a showing of all parts at a reasonable size thereof. Accordingly, because of such compression or foreshortening, the angle of the projected reference beam 19 to the medium 12 appears to vary across that medium somewhat more strongly than it does in practice. At any rate, it has been found that a certain variation of the angle 18 between the object and reference beams with apparatus according to the subject invention is still well within the spatial frequency tolerance of commercial recording media.

According to the illustrated preferred embodiment of the subject invention, the reflected object beam 17 is projected onto the light-responsive medium 13 at a constant angle of incidence 21 to and throughout such medium. This also renders the hologram insensitive to object size throughout the medium 13 and produces outstanding signal-to-noise ratios.

According to a further embodiment of the subject invention, the system 10 includes an aperture 23 and the reflected object beam 17 is projected through that aperture to the light-responsive medium 13. According to an embodiment of the subject invention, the aperture 23 has or is provided with a diameter equal to the angle 18 of the reflected object beam 17 to the reference beam 19, divided by the product of an angular resolution required for the object in question, and the spatial frequency of the hologram. In this respect, the spatial frequency is equal to the angle between object and reference beams 17 and 19, divided by the wavelength of the light of laser 26.

By way of example, if the wavelength of the light of the laser 26 is 0.5 microns and the required or desired angular resolution for the object 12 is 0.001 radians or 3.4 minutes of arc, then the diameter of the aperture 23 is made 0.5 millimeters pursuant to a preferred embodiment of the subject invention.

According to the illustrated preferred embodiment of the invention, the reflected object beam 17 is projected through a lens or lens system 24 causing the latter object beam to impinge on the light-responsive medium at a constant angle of incidence 21 throughout that medium. In practice, the component 24 is an imaging lens which also collimates the reflected object beam 17 except for a slight spread across or throughout the medium 13. The latter slight spread is optimally such as to keep the angle 18 sufficiently constant throughout the medium 13 within the above mentioned spatial frequency tolerance of the recording or light-responsive medium.

As seen in the drawing, the reflected object beam 17 is projected through aperture 23 and lens 24 causing the latter object beam to impinge on the light-responsive medium 13 at the mentioned constant angle of incidence 21 across or throughout such medium.

As indicated in the drawing, a polarizer 25 may be provided between the aperture 23 and the medium 13 or lens 24 to assure that the reflected object beam 17 corresponds in polarization to the reference beam 19, even where the object 12 or retro-reflective paint 58 have a depolarizing effect on the object beam.

Other means for achieving the objects of the subject invention and its embodiments are also shown in the drawing, and will now be described in greater detail.

In particular, the holographic system 10 operates with a laser 26 that emits a laser beam 27 through a normally open shutter 28 to a beam splitter 29, which issues a reference beam 15 and an object beam 16. A shutter 31 may be employed for permitting transmission of the reference beam without the object beam. A similar shutter (not shown) may be provided between the first beam splitter 29 and second beam splitter 32 in order to enable emission of the object beam 16, without the reference beam 15. In practice, this may be useful for adjustment, setup and image reproduction purposes.

Mutually spaced mirrors 34, 35, 36 and 37 reflect the object beam along predetermined paths to the object 12. Similarly, spaced mirrors 41, 42 and 43 reflect the reference beam 15 along predetermined reference beam paths to a location at the object 12 where the reference beam is reflected along its own path by a small reflector 45. In principle, the reflector 45 may be a mirror which is oriented at such an angular position as to reflect the reference beam into the path along which it came. In practice, a corner reflector or cateye, which returns light in the direction in which it came, may advantageously be employed at 45.

It should be recognized at this point that the drawing is not to scale and that the angled reference beam and object beam paths are preferably dimensioned and positioned in a conventional manner so that the object and reference beams reach the medium 13 along paths of equal lengths.

The second beam splitter 32 separates the returning reference beam 19 from the outgoing reference beam. A mirror 47 reflects the returning reference beam 19 to a lens 48 which projects such returning reference beam to the medium 18 and also slightly spreads the reflected reference beam 19 to cover the width and height of the medium 13. If desired, the lens 48 may be part of a spatial filter including a pinhole 49.

A lens 51 in the object beam path converges the object beam 16 to a point from where it spreads sidewise for reflection by mirrors 35 and 36 to a further lens or lens system 52. In practice, the component 52 may have an auxiliary collimating lens associated therewith. However, the main function of the lens or lens system 52 is to focus the object beam onto the mirror 37, which is small compared to the other mirrors of the system.

In terms of the illustrated equipment and equivalents thereof, it may be said that the reflected object beam 17 is projected through the aperture 23 to the light-responsive medium 13 after there is first generated an object beam 16, such as at 26 and 29. That generated object beam is reflected near the aperture 23 with the small mirror 37 to the object 12 for reflection as the reflected object beam 17 to the medium 13. According to an embodiment of the subject invention, the aperture 23 is shielded against the generated object beam 16 during reflection of that generated object beam near the aperture 23. To this end, a mask 54 may be employed for shielding the aperture 23 and the path of the reflected object beam 17 against the object beam 16 traveling to the mirror 37 and thence to the object 12.

In practice, the mask 54 or equivalent shielding means may supplement the opaque structure 56 through which the aperture 23 extends.

While the subject invention operates well without reflective coatings, very brilliant holograms can be produced by coating the object 12 with a retro-reflective paint or layer 58. As already indicated in the above mentioned third article by Fagan and Waddell, highly effective reflective paints and other material are readily available for holographic purposes.

In either case, the lens 24 forms a real image of the object 12 in the image plane 59. When the hologram on the medium 13 is viewed with the aid of the reference beam, a virtual image of the object is reproduced in the image plane 59 and a corresponding holographic image of the object appears then also to the observer.

In this manner, all kinds of holographic imaging, recording, design and testing functions may be carried out with the subject invention and embodiments thereof. The holograms generated according to the subject invention are characterized by outstanding signal-to-noise ratios and image quality within the optimum bandwidth of the holographic recording or light-sensitive medium. Also, the subject invention readily can handle large objects, since the illustrated preferred embodiment and equivalents thereof render the hologram insensitive to object size.

The subject extensive disclosure suggest or renders apparent to those skilled in the art various modifications and variations within the spirit and scope of the disclosed invention and equivalents thereof.

I claim:

1. In a method of making a hologram of an object on a light-responsive medium with the aid of a reference beam and an object beam reflected by the object, the improvement comprising the step of:
    rendering the hologram throughout said light-responsive medium insensitive to object size by projecting said reflected object beam into said medium at an angle to said reference beam constant throughout said medium within a tolerance imperceptible to said light-responsive medium in terms of spatial frequency of the hologram.

2. A method as claimed in claim 1, including the step of:
projecting said reflected object beam onto said light-responsive medium at a constant angle of incidence to said medium.

3. A method as claimed in claim 1, including the step of:
projecting said reflected object beam through an aperture to said light-responsive medium.

4. A method as claimed in claim 3, including the step of:
projecting said reflected object beam onto said light-responsive medium at a constant angle of incidence to said medium.

5. A method as claimed in claim 3, including the steps of:
providing said reflected object beam by first generating an object beam and reflecting said generated object beam near said aperture to said object for projection of the thus provided reflected object beam through said aperture to said light-responsive medium; and
shielding said aperture against said generated object beam during the reflection thereof near said aperture.

6. A method as claimed in claim 1, including the steps of:
providing an aperture with a diameter equal to said angle of said reflected object beam to said reference beam, divided by a product of an angular resolution required for said object, and said spatial frequency; and
projecting said reflected object beam through said aperture to said light-responsive medium.

7. A method as claimed in claim 6, including the step of:
projecting said reflected object beam onto said light-responsive medium at a constant angle of incidence to said medium.

8. A method as claimed in claim 1, including the step of:
projecting said reflected object beam through a lens causing the latter object beam to impinge on said light-responsive medium at a constant angle of incidence to said medium.

9. A method as claimed in claim 1, including the step of:
projecting said reflected object beam through an aperture and a lens causing the latter object beam to impinge on said light-responsive medium at a constant angle of incidence to said medium.

10. A method as claimed in claim 1, including the steps of:
providing an aperture with a diameter equal to said angle of said reflected object beam to said reference beam, divided by a product of an angular resolution required for said object, and said spatial frequency; and
projecting said reflected object beam through said aperture and a lens causing the latter object beam to impinge on said light-responsive medium at a constant angle of incidence to said medium.

11. In apparatus for making a hologram of an object on a light-responsive medium with the aid of a reference beam and an object beam, the improvement comprising in combination:
first means for projecting said object beam to said object for reflection thereby; and
second means for rendering the hologram throughout said light-responsive medium insensitive to object size, including means for projecting the reflected object beam into said medium at an angle to said reference beam constant throughout said medium within a tolerance imperceptible to said light-responsive medium in terms of spatial frequency of the hologram.

12. Apparatus as claimed in claim 11, wherein:
said second means include means for projecting said reflected object beam onto said light-responsive medium at a constant angle of incidence to said medium.

13. Apparatus as claimed in claim 11, wherein:
said second means include an aperture and means for projecting said reflected object beam through said aperture to said light-responsive medium.

14. Apparatus as claimed in claim 13, wherein:
said second means include means for projecting said reflected object beam through said aperture to said light-responsive medium at a constant angle of incidence to said medium.

15. Apparatus as claimed in claim 11, wherein:
said second means include an aperture having a diameter equal to said angle of said reflected object beam to said reference beam, divided by a product of an angular resolution required for said object, and said spatial frequency, and means for projecting said reflected object beam through said aperture to said light-responsive medium.

16. Apparatus as claimed in claim 15, wherein:
said second means include means for projecting said reflected object beam onto said light-responsive medium at a constant angle of incidence to said medium.

17. Apparatus as claimed in claim 11, wherein:
said second means include lens means for projecting the reflected object beam onto said light-responsive medium at a constant angle of incidence to said medium.

18. Apparatus as claimed in claim 11, wherein:
said second means include an aperture and lens combination for projecting the reflected object beam onto said light-responsive medium at a constant angle of incidence to said medium.

19. Apparatus as claimed in claim 11, wherein:
said second means include an aperture having a diameter equal to said angle of said reflected object beam to said reference beam, divided by a product of an angular resolution required for said object, and said spatial frequency, and lens means combined with said aperture for projecting said reflected object beam in conjunction with said aperture onto said light-responsive medium at a constant angle of incidence to said medium.

20. In apparatus for making a hologram of an object on a light-responsive medium with the aid of a reference beam and an object beam, the improvement comprising in combination:
an aperture spaced from said medium;
means near said aperture for reflecting said object beam to said object for reflection thereby;
means near said aperture for shielding said aperture against the latter object beam during reflection thereof near said aperture; and
means for rendering the hologram throughout said light-responsive medium insensitive to object size, including means for projecting the object beam reflected by said object through said aperture into said medium at an angle to said reference beam constant throughout said medium within a tolerance imperceptible to said light-responsive medium in terms of spatial frequency of the hologram.

* * * * *